March 11, 1947.  H. T. RITTER  2,417,178

BIRD HOUSE AND PARTITION ELEMENT

Filed Feb. 27, 1941

INVENTOR
Henry T. Ritter
BY
Harness, Dickey & Pierce
ATTORNEYS.

Patented Mar. 11, 1947

2,417,178

UNITED STATES PATENT OFFICE 2,417,178

BIRD HOUSE AND PARTITION ELEMENT

Henry T. Ritter, South Rockwood, Mich.

Application February 27, 1941, Serial No. 380,843

5 Claims. (Cl. 119—23)

My invention relates to bird houses, and particularly to a bird house made of a ceramic element such as a flower pot and to a disc for forming a partition therein.

The bird house is constructed, preferably, from an inverted flower pot having a dish-shaped metal disc sprung into the open end of the pot to form a partition parallel to the closed end thereof. The disc is dish-shaped, with the peripheral edge frusto-conical in form so as to provide more resiliency to force the peripheral edge into the ceramic material and positively anchor the disc thereto. An ornamental ceramic roof element is attached to the closed end of the pot by an eye bolt, which provides means for suspending the resulting bird house from a branch or other supporting element. Various colored paints may be applied to the roof element and to the pot, in contrasting colors, to ornament the resulting bird house. The particular disc is also useful in forming a partition near the base of the flower pot to form a reservoir for the collection of water below the disc.

Accordingly, the main objects of my invention are; to form a bird house from a ceramic pot and roof element which are secured and suspended by an eye bolt; to employ a flower pot as a bird house by forming an opening in the wall thereof and closing the open end of the pot by a metal disc, the tension of which anchors the disc to the wall; to form a bird house from an inverted flower pot having an opening in the side wall and a floor formed by a disc anchored in the open end thereof with a roof made from a ceramic element which is secured to the pot by an eye bolt by which the assembly is suspended; to provide a dish-shaped disc having a frusto-conical edge portion which permits the disc to be sprung when forced into the pot to provide tension for anchoring the disc in the wall thereof; and in general, to provide a bird house and a disc for forming a partition therein which is simple in construction and economical of manufacture.

Other objects and features of novelty of my invention will be either specifically pointed out or will become apparent when referring, for a better understanding of my invention, to the following description taken in conjunction with the accompanying drawing, wherein.

Figure 1:
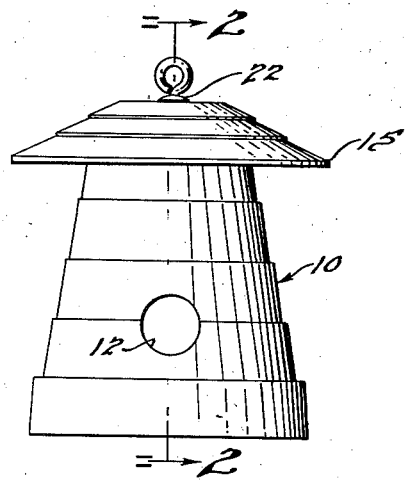
Figure 1 is a view in elevation of a bird house embodying features of my invention.
Figure 3:
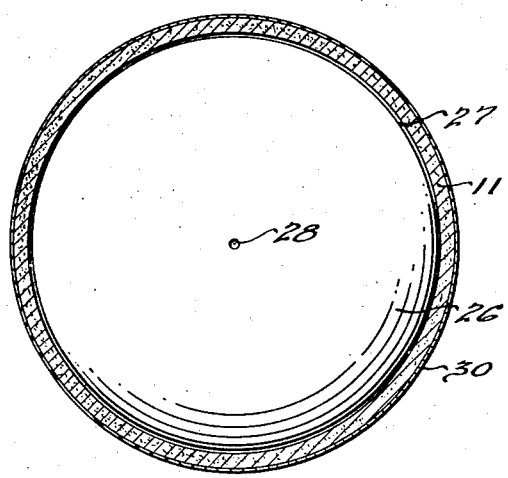
Fig. 3 is a sectional view of structure illustrated in Fig. 2, taken on the line 3—3 thereof.
Figure 2:
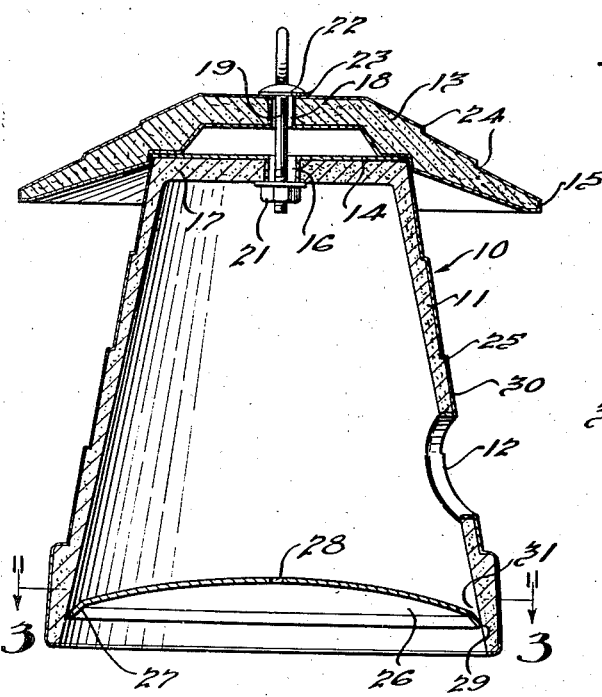
Fig. 2 is an enlarged, sectional view of structure illustrated in Fig. 1, taken on the line 2—2 thereof.

Referring to Figs. 1, 2 and 3, I have illustrated a bird house 10, the enclosing portion 11 of which is an earthenware flower pot of conventional form disposed in inverted position having a smooth inner wall, as illustrated in Figs. 1 and 2. A circular opening 12 is cut through the wall of the pot, preferably before the clay thereof is baked. A roof element 13 is made of ceramic material having a flat portion 14 which may be slightly recessed to position the base of the pot relative thereto and having the portion outwardly thereof sloping to the peripheral edge 15. A central aperture 16 is provided in the base 17 of the flower pot 11 aligned with the aperture 18 in the roof element 13.

An eye bolt 19 extends through the apertures and unites the roof element 13 to the base 17 when secured by a nut 21. An inverted cup-shaped washer 22, which may be secured to the eye bolt 19 or which may be a separate element, forms a cover for the opening 18 to prevent moisture from entering the bird house. A washer 23, of rubber or other sealing material, may be employed to positively seal the washer 22 to the roof element 13. The sloping outer surface of the roof element 13 may be stepped, as at 24, to conform to the steps 25 conventionally provided in the flower pot 11 to enhance the appearance of the assembled elements. Paint 30 is preferably applied to the flower pot 11 and to the roof elements 13 before assembly so that contrasting colors may be applied. The flower pot 11 may be painted a bright yellow, for example, and the roof may be painted a bright green. Other contrasting colors may be employed so that the bird houses are bright and attractive in appearance.

For closing the open end of the flower pot 11, I employ a metal disc 26 which is dish-shaped and provided with a frusto-conical portion at its peripheral edge. One or a plurality of openings 28 may be provided through the disc for draining the pot and for ventilating the bird house. The disc is forced into the end of the pot with sufficient pressure to have the edges bite into the wall thereof. A spring tension of material force forces the sharp corner 29 into the wall of the pot and firmly anchors the disc in place. Any water which may be blown through the opening 12 of the pot will flow into the trough 31 between the wall of the pot and the edge of the disc and drain through therefrom at the disc edge.

Figure 4:
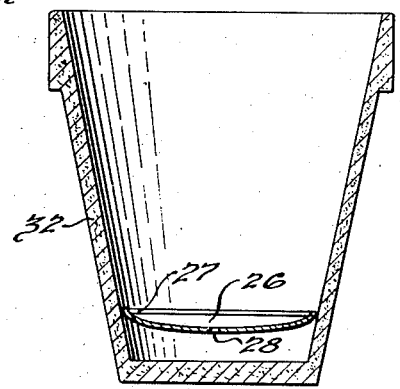
Fig. 4 is a sectional view of a flower pot and a disc forming a partition therein.

The bird house constructed in this manner is inexpensive of manufacture, and, being made of ceramic material, is rugged in construction. The disc 26 forms a partition in the flower pot which, through the engagement of the sharp edge thereof with the inner wall of the pot under material tension, may be employed as the floor of the bird house, as illustrated in Fig. 2, or as a partition in the flower pot 32, as illustrated in Fig. 4, near the base thereof to provide a reservoir for water below the disc. The pervious wall of the pot will function as a wick for drawing the moisture upwardly above the disc to feed the roots of the plant, while the bottom of the earth within the pot is maintained reasonably dry because of the presence of the drain hole or holes 28 in the disc.

While I have described and illustrated but a single embodiment of my invention, it will be apparent to those skilled in the art that various changes, omissions, additions and substitutions may be made therein without departing from the spirit and scope of my invention, as set forth in the accompanying claims.

What I claim is:

1. A bird house comprising a flowerpot-like member made of earthenware and having an opening in the side wall thereof, a roof element covering the top closed end thereof also made of earthenware, means for securing said pot-like member and element together, and a resilient disc closing the open end of said pot-like member when spring-pressed into the wall thereof.

2. A bird house including, in combination, an inverted flowerpot-like member made of earthenware and having an opening in the side wall thereof, a roof element made of earthenware covering the top closed end thereof, an eye-bolt securing said pot-like member and element together and forming means whereby the resulting bird house may be supported, and a resilient disc for closing the open end of said pot-like member disposed entirely therewithin and spring-pressed into the wall thereof.

3. A bird house including, in combination, an inverted flowerpot-like member made of earthenware and having an opening in the wall thereof, a roof element made of earthenware recessed to receive and position the closed end of the pot-like member, an eye-bolt securing said pot-like member, and element together forming means whereby the resulting bird house may be supported, and a resilient metal disc of less diameter than the open end of the pot-like member inserted therein and spring-pressed to the wall thereof.

4. A bird house including, in combination, an inverted flowerpot-like member made of earthenware and having an opening in the wall thereof, and a downwardly concaved disc sprung against the wall of the pot-like member near its open end to form the floor of the house.

5. A bird house including, in combination, an inverted flowerpot-like member made of earthenware and having an opening in the wall thereof, and a resilient concaved disc having a frusto-conical peripheral portion forced into the open end of the pot-like member and retained in position by the tension exerted by the disc which forces the edge thereof into the inner wall to form the floor of the housing.

HENRY T. RITTER.

REFERENCES CITED

The following references are of record in the file of this patent:

UNITED STATES PATENTS

| Number | Name | Date |
|---|---|---|
| 1,258,703 | Perkins | Mar. 12, 1918 |
| 2,077,208 | Brady | Apr. 13, 1937 |
| 2,219,297 | Copeman | Oct. 29, 1940 |
| 327,099 | Painter | Sept. 29, 1885 |
| 1,174,568 | Griffin | Mar. 7, 1916 |
| 1,114,375 | Litaker | Oct. 20, 1914 |
| 2,112,834 | Egan | Apr. 5, 1938 |
| 1,894,406 | Lenhart | Jan. 17, 1933 |
| 1,534,508 | Earp-Thomas | Apr. 21, 1925 |
| 777,609 | Deane | Dec. 13, 1904 |
| 1,432,475 | Lord | Oct. 17, 1922 |
| 681,672 | Andrews | Sept. 3, 1901 |
| 1,062,542 | Kendrick | May 20, 1913 |

FOREIGN PATENTS

| Number | Country | Date |
|---|---|---|
| 34,530 | Austria | Sept. 25, 1908 |
| 339,680 | England | Dec. 15, 1930 |
| 97,576 | Switzerland | Mar. 16, 1923 |

OTHER REFERENCES

Homes for Birds, Farmers' Bulletin No. 1456, issued in 1930 by the U. S. Dept. of Agriculture.